United States Patent
Zhang et al.

(10) Patent No.: US 10,260,418 B2
(45) Date of Patent: Apr. 16, 2019

(54) EVAPORATIVE COOLING SYSTEMS AND METHODS

(71) Applicant: General Electric Company, Schenectady, NY (US)

(72) Inventors: Hua Zhang, Greer, SC (US); Naveen Ghattadhahalli Parmeshwar, Greenville, SC (US); Christopher Conrad Frese, Greenville, SC (US); Valery Ivanovich Ponyavin, Greenville, SC (US); Bradly Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 15/463,902

(22) Filed: Mar. 20, 2017

(65) Prior Publication Data

US 2018/0266323 A1 Sep. 20, 2018

(51) Int. Cl.
| | |
|---|---|
| *F02C 7/05* | (2006.01) |
| *F02C 7/057* | (2006.01) |
| *F28C 3/08* | (2006.01) |
| *F28F 27/00* | (2006.01) |
| *F02C 7/055* | (2006.01) |
| *F28F 25/08* | (2006.01) |
| *F28D 21/00* | (2006.01) |

(52) U.S. Cl.
CPC .............. *F02C 7/057* (2013.01); *F02C 7/055* (2013.01); *F28C 3/08* (2013.01); *F28F 25/087* (2013.01); *F28F 27/00* (2013.01); *F05D 2260/207* (2013.01); *F05D 2260/80* (2013.01); *F05D 2270/303* (2013.01); *F05D 2270/311* (2013.01); *F28D 2021/0026* (2013.01)

(58) Field of Classification Search
CPC .. F02C 7/05; F02C 7/055; F02C 7/057; F02C 7/141; F02C 7/143; F02C 7/16; F28C 3/08; F28C 25/08; F28C 25/087; F05D 2260/207; F05D 2270/303; F01D 25/12
USPC ......................................................... 415/116
See application file for complete search history.

(56) References Cited

U.S. PATENT DOCUMENTS

| | | | |
|---|---|---|---|
| 7,090,712 B2 * | 8/2006 | Gillingham | B01D 39/1623 55/486 |
| 7,179,317 B2 * | 2/2007 | Chung | B01D 39/086 55/528 |
| 8,662,150 B2 | 3/2014 | Kippel | |
| 2009/0294548 A1 | 12/2009 | Geiger | |

(Continued)

*Primary Examiner* — Hung Q Nguyen
*Assistant Examiner* — Johnny H Hoang
(74) *Attorney, Agent, or Firm* — Eversheds Sutherland (US) LLP (57) ABSTRACT

The present application provides a method of evaluating media effectiveness in a gas turbine engine. The method may include the steps of receiving a baseline media effectiveness rating, receiving a media replacement cost, receiving a number of operating parameters from a number of sensors, based at least in part on the operating parameters and the baseline media effectiveness rating, determining a media effectiveness model, based at least in part of the media effectiveness model, determining a loss in evaporative benefit cost over time, determining a time t when the loss in evaporative benefit cost exceeds the media replacement cost, and scheduling media replacement at time t.

15 Claims, 5 Drawing Sheets

(56) References Cited

U.S. PATENT DOCUMENTS

| | | | |
|---|---|---|---|
| 2013/0283757 A1* | 10/2013 | Bordne | ............. F01D 25/125 60/39.08 |
| 2014/0123674 A1 | 5/2014 | Hao | |
| 2015/0121881 A1 | 5/2015 | Zhang | |
| 2015/0315970 A1 | 11/2015 | John | |
| 2015/0322865 A1 | 11/2015 | Scipio | |
| 2015/0377569 A1 | 12/2015 | Zhang | |
| 2016/0053637 A1 | 2/2016 | Zhang | |
| 2016/0108816 A1 | 4/2016 | Zhang | |
| 2016/0146043 A1 | 5/2016 | Zhang | |

\* cited by examiner

EVAPORATIVE COOLING SYSTEMS AND METHODS

TECHNICAL FIELD

The present application and the resultant patent relate generally to gas turbine engines and more particularly relate to evaporative cooling systems and monitoring methods for optimized media use and replacement for improved overall efficiency.

BACKGROUND OF THE INVENTION

A conventional gas turbine engine includes a compressor for compressing a flow of ambient air, a combustor for mixing the compressed flow of ambient air with a flow of fuel to create a flow of hot combustion gases, and a turbine that is driven by the hot combustion gases to produce mechanical work. The turbine may drive a load such as a generator for electrical power. Various strategies are known for increasing the amount of power that a gas turbine engine may be able to produce. One method of increasing the power output is by cooling the ambient air flow upstream of the compressor. Such cooling may cause the air flow to have a higher density, thereby creating a higher mass flow rate into the compressor. The higher mass flow rate into the compressor allows more air to be compressed so as to allow the gas turbine engine to produce more power. Moreover, cooling the ambient air flow generally may increase the overall efficiency of the gas turbine engine in hot environments.

Various systems and methods may be utilized to cool the ambient air flow entering the gas turbine engine. For example, inlet air systems with one or more heat exchangers may be used to cool the ambient air flow through latent cooling or through sensible cooling. Such heat exchangers often may utilize a wetted media pad to facilitate the cooling of the ambient air flow. These wetted media pads may allow heat and/or mass transfer between the ambient air flow and a coolant flow such as a flow of water. The ambient air flow interacts with the coolant flow in the wetted media pad for heat exchange therewith. The airflow passages through such wetted media pads are intended to provide effective water evaporation and mixing of the flow of ambient air with the water vapor from the flow of water. As the air velocity increases, however, water shedding may occur. Specifically, airborne water droplets may coalesce in a downstream inlet duct and/or flow into the compressor. Such water droplets may cause blade abrasion and other types of damage.

Current evaporative cooling media replacement intervals may range from about one to five years or about 18,000 hours of operation depending upon the usage, the air quality, the water quality, and other types of parameters. Media degradation over time results in a reduction in overall gas turbine efficiency. The costs and the downtime require to replace the media, however, must be balanced with this possible reduction in efficiency.

SUMMARY OF THE INVENTION

The present application and the resultant patent thus provide a method of evaluating media effectiveness in a gas turbine engine. The method may include the steps of receiving a baseline media effectiveness rating, receiving a media replacement cost, receiving a number of operating parameters from a number of sensors, based at least in part on the operating parameters and the baseline media effectiveness rating, determining a media effectiveness model, based at least in part of the media effectiveness model, determining a loss in evaporative benefit cost over time, determining a time t when the loss in evaporative benefit cost exceeds the media replacement cost, and scheduling media replacement at time t.

The present application and the resultant patent further provide a gas turbine system. The gas turbine system may include an inlet air system with a synthetic media pad, a number of sensors capable of receiving operating parameters, and a controller in communication with the sensors. The controller is operable to perform the following operations including determine a media effectiveness model based in part on the operating parameters, determine a loss in evaporative benefit cost over time based in part on the media effectiveness model, determine a time t when the loss in evaporative benefit cost exceeds the media replacement cost, and scheduling media replacement at time t.

These and other features and improvements of the present application and the resultant patent will become apparent to one of ordinary skill in the art upon review of the following detailed description when taken in conjunction with the several drawings and the appended claims.

DETAILED DESCRIPTION

Figures 1, 2:
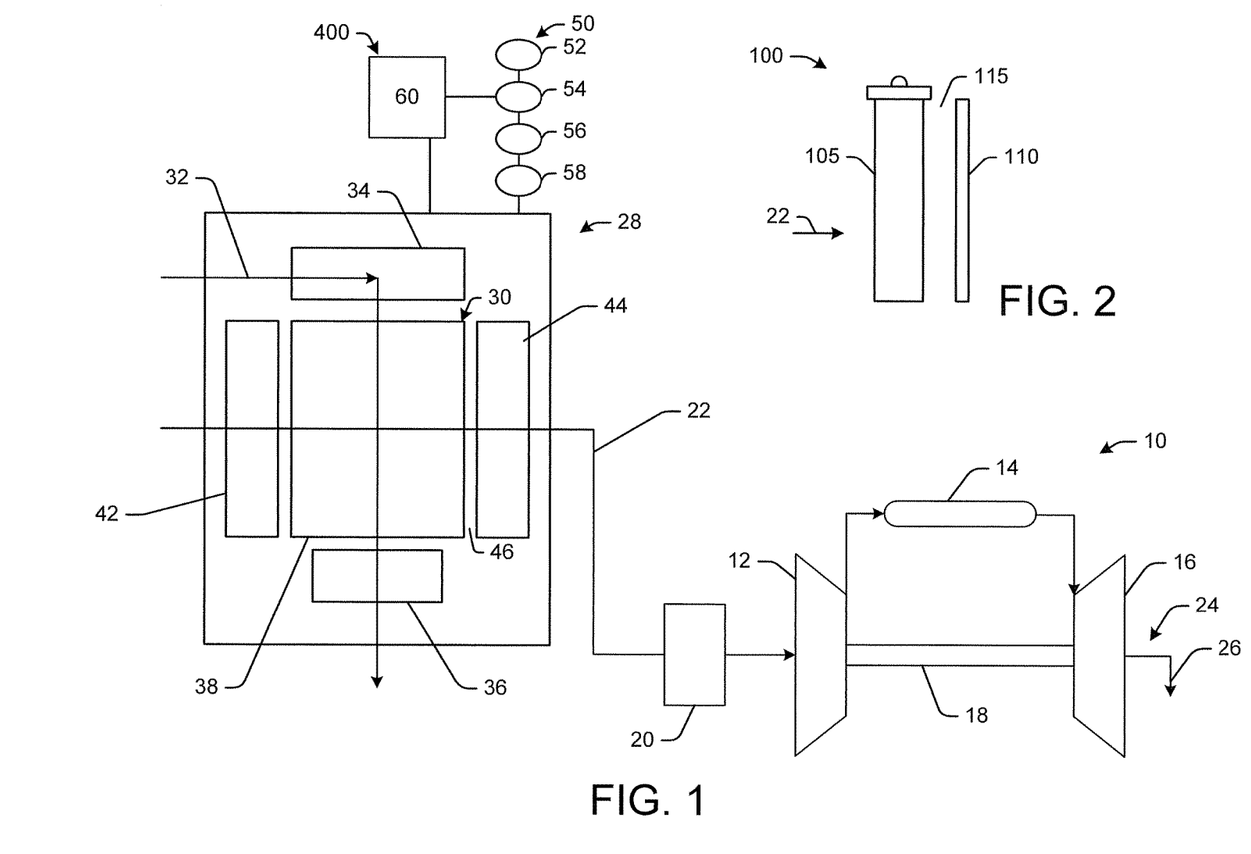
FIG. 1 is a schematic diagram of a gas turbine engine with an inlet air system.
FIG. 2 is a schematic diagram of an inlet air system as may be described herein.

Referring now to the drawings, in which like numerals refer to like elements throughout the several views, FIG. 1 is a schematic diagram of an example of a gas turbine engine 10. The gas turbine engine 10 may include a compressor 12, a combustor 14, and a turbine 16. Although only a single combustor 14 is shown, any number of the combustors 14 may be used herein and positioned in a circumferential array and the like. The compressor 12 and the turbine 16 may be coupled by a shaft 18. The shaft 18 may be a single shaft or a number of shaft segments coupled together. The shaft 18 also may drive a load such as a generator and the like.

The gas turbine engine 10 further may include a gas turbine air inlet 20. The air inlet 20 may be configured to accept an inlet air flow 22. For example, the air inlet 20 may be in the form of a gas turbine inlet house and the like. Alternatively, the air inlet 20 may be any portion of the gas turbine engine 10, such as any portion of the compressor 12 or any apparatus upstream of the compressor 12 which may accept the inlet air flow 22. The inlet air flow 22 may be ambient air and may be conditioned or unconditioned.

The gas turbine engine 10 further may include an exhaust outlet 24. The exhaust outlet 24 may be configured to discharge a gas turbine exhaust flow 26. The exhaust flow 26 may be directed to a heat recovery steam generator (not shown). Alternatively, the exhaust flow 26 may be, for example, directed to an absorption chiller (not shown) to chill a flow of water, directed to a heat recovery steam generator (not shown), directed to a desalination plant, or dispersed into the ambient air in whole or in part.

The gas turbine engine 10 further may include an inlet air system 28 with one or more heat exchangers 30. The inlet air system 28 may be configured to cool the inlet air flow 22 before entry into the compressor 12. For example, the inlet air system 28 may be disposed about the gas turbine air inlet 20. Alternatively, the inlet air system 28 may be upstream or downstream of the gas turbine inlet 20. The inlet air system 28 may allow the inlet air flow 22 and a heat exchange medium such as a flow of water 32 to exchange heat in the heat exchanger 30. The heat exchange medium also may be any suitable type of fluid flow. The heat exchanger 30 thus may facilitate the interaction of the inlet air flow 22 and the flow of water 32 therein so as to cool the inlet air flow 22 before entering the compressor 12.

The heat exchanger 30 may be a direct contact type heat exchanger 30. The heat exchanger 30 may include a heat exchange medium inlet 34, a heat exchange medium outlet 36, and a wetted media pad 38 therebetween. The flow of water 32 or other type of heat exchange medium may flow through the heat exchange medium inlet 34 to the wetted media pad 38. The heat exchange medium inlet 34 may include a nozzle, a number of nozzles, a manifold with an orifice or a number of orifices, and the like. The heat exchange medium outlet 36 may accept the flow of water 32 exhausted from the wetted media pad 38. The heat exchange medium outlet 36 may be a sump disposed downstream of the media pad 38 in the direction of the flow of water 32. The flow of water 32 may be directed in a generally or approximately downward direction from the heat exchange medium inlet 34 through the wetted media pad 38 while the inlet air flow 22 may be directed through the heat exchanger 30 in a direction generally or approximately perpendicular to the direction of the flow of water 32. Other types of counter or cross flow arrangements also may be used.

A filter 42 may be disposed upstream of the wetted media pad 38 in the direction of inlet air flow 22. The filter 42 may be configured to remove particulates from the inlet air flow 22 so as to prevent the particulates from entering into the gas turbine engine 10. Alternatively, the filter 42 may be disposed downstream of the wetted media pad 38 in the direction of inlet air flow 22. A drift eliminator 44 may be disposed downstream of the wetted media pad 38 in the direction of inlet air flow 22. The drift eliminator 44 may act to remove droplets of the flow of water 32 from the inlet air flow 22 before the inlet air flow 22 enters the compressor 12. As described above, the drift eliminator 44 may include a number of thermoplastic components positioned at an angle downstream of the media pad 38 and the like. The angle changes the direction of the airstream to separate the water droplets therein. The wetted media pad 38 and the drift eliminator 44 may be separated by a gap 46. The length of the gap 46 may vary.

The heat exchanger 30 may be configured to cool the inlet air flow 22 through latent or evaporative cooling. Latent cooling refers to a method of cooling where heat is removed from a gas, such as air, so as to change the moisture content of the gas. Latent cooling may involve the evaporation of a liquid at an ambient temperature that is higher than the wet bulb temperature to cool the gas. Specifically, latent cooling may be utilized to cool a gas to near its wet bulb temperature from a higher temperature. Alternatively, the heat exchanger 30 may be configured to chill the inlet air flow 22 through sensible cooling. Sensible cooling refers to a method of cooling where heat is removed from a gas, such as air, by convection heat transfer between water in the media and the inlet air, so as to change the dry bulb and wet bulb temperatures of the air. Sensible cooling may involve chilling a liquid and then using the chilled liquid to cool the gas. Specifically, sensible cooling may be utilized to cool a gas to below its wet bulb temperature. It should be understood that latent cooling and sensible cooling are not mutually exclusive cooling methods. Rather, these methods may be applied either exclusively or in combination. It should further be understood that the heat exchanger 30 described herein is not limited to latent cooling and sensible cooling methods, but may cool, or heat, the inlet air flow 22 through any suitable cooling or heating method as may be desired.

Overall operation of the inlet air system 28 may be monitored by a number of sensors 50. The sensors may include a number of humidity sensors 52, a number of temperature sensors 54, current sensors 56, conductivity sensors 58, and the like. The humidity sensors 52 may determine the humidity downstream of the media pad 38 as well as ambient humidity. The temperature sensors 54 may determine the temperature of the flow of water 32 before and after the media pad 38, plenum temperature, as well as ambient temperature. The current sensors 56 may determine the current in the water circulation pump. The conductivity sensors may determine the electric conductivity in the return water path. The conductivity may increase in the presence of substances in the water path that may promote scaling and corrosion. Other types of sensors may be used herein to monitor any type of operational parameter. Overall operations of the inlet air system 200 may be controlled by the overall gas turbine controller 60 (e.g., a "GE Speedtronic" controller or a similar device) or a dedicated controller per the optimization logic. ("Speedtronic is a trademark of the General Electric Company of Schenectady, New York.) Other components and other configurations may be used herein.

FIGS. 2 show an example of an inlet air system 100 as may be described herein. In this example, the inlet air system 100 may include a wetted media pad 105 and a downstream drift eliminator 110. The wetted media pad 105 and the drift eliminator 110 may be separated by a gap 115. The length of the gap 115 may vary. The wetted media pad 105 and/or the drift eliminator 110 may be made out of a synthetic media pad 120 in whole or in part. The wetted media pad 105 and the drift eliminator 110 may have any suitable size, shape, or configuration. Other components and other configurations may be used herein.

Figure 3:
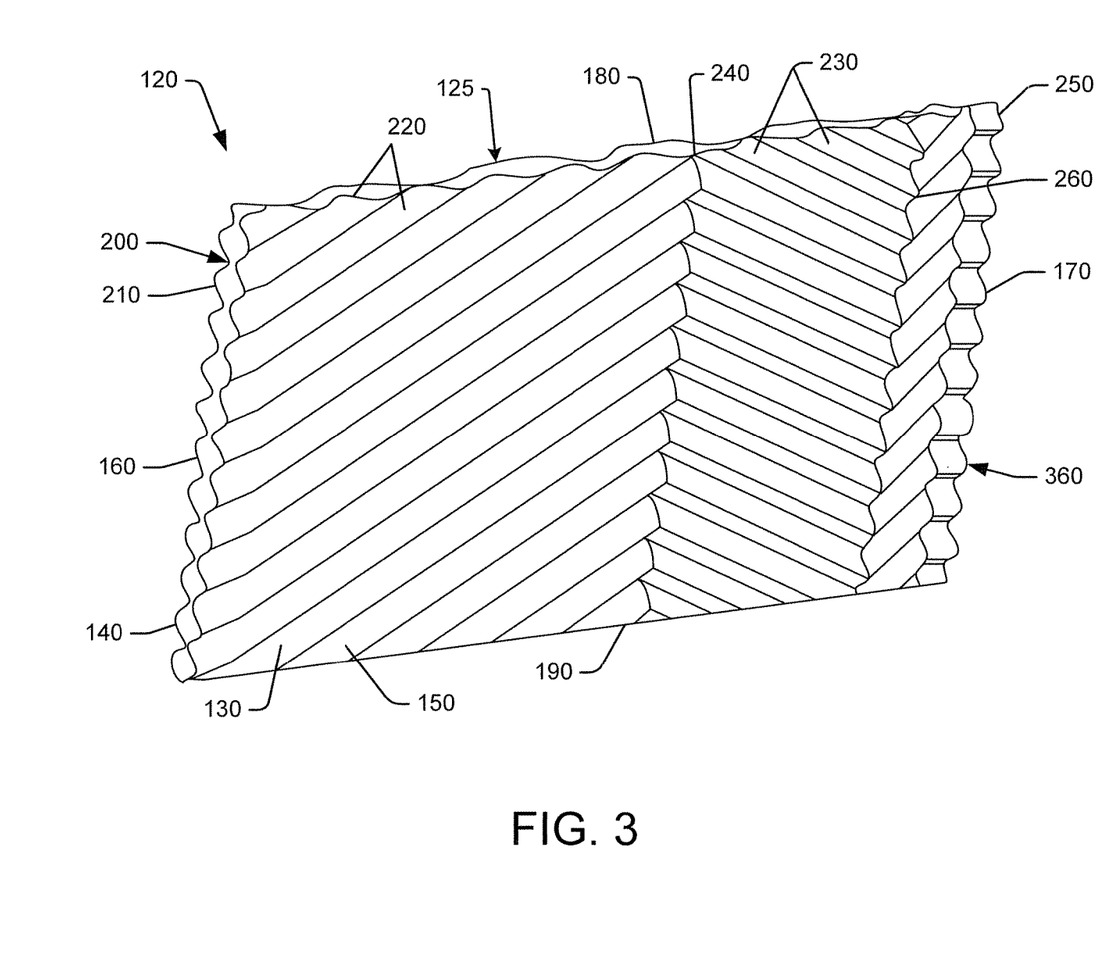
FIG. 3 is a perspective view of a first side of a fibrous media pad that may be used with the inlet air system of FIG. 2.
Figure 4:
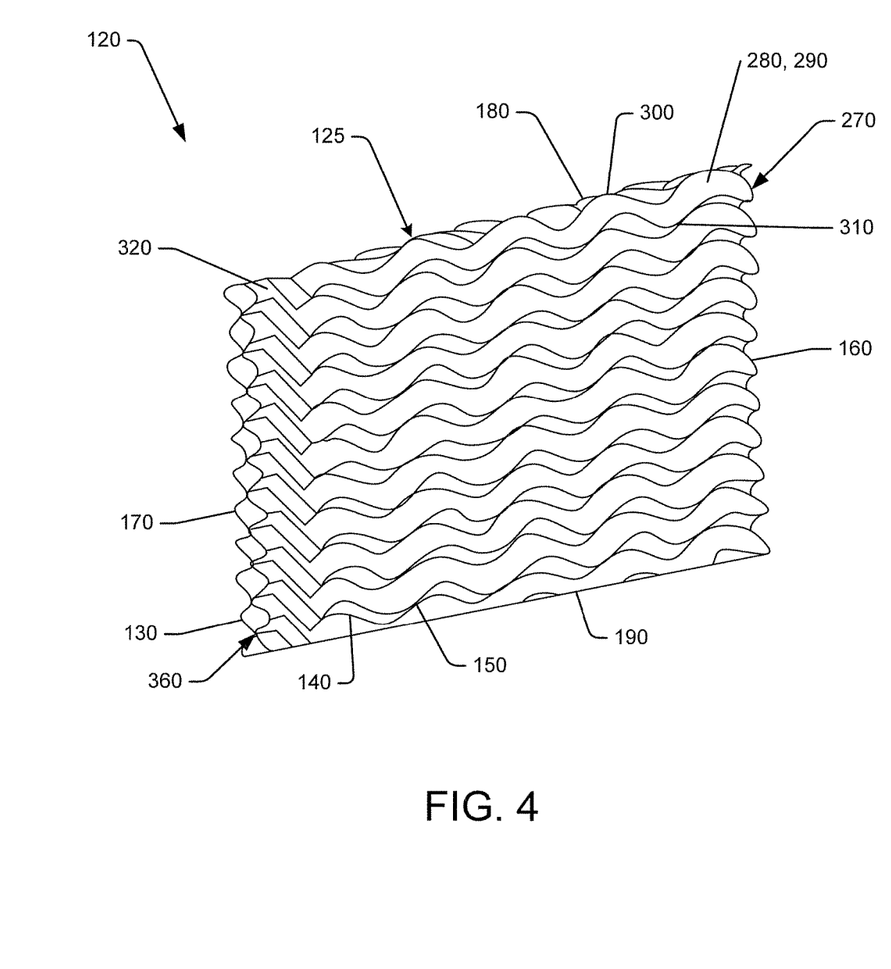
FIG. 4 is a perspective view of a second side of the fibrous media pad of FIG. 3.
Figure 5:
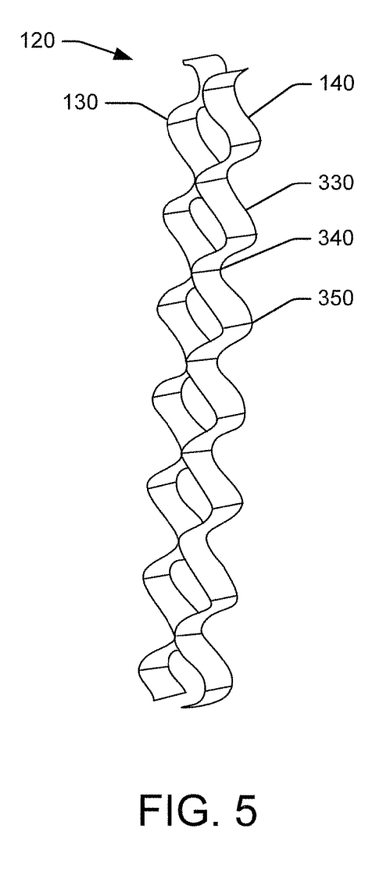
FIG. 5 is a side view of the fibrous media pad of FIG. 3.

As is shown in FIGS. 3-5, the synthetic media pad 120 may include at least a pair of media sheets 125 therein. In this example, a first media sheet 130 and a second media sheet 140 are shown although additional sheets may be used herein. Any number of the media sheets 125 may be used herein in any suitable size, shape, or configuration. The media sheets 125 may be thermally formed from non-woven synthetic fibers with or without hydrophilic surface enhancements. For example, the non-woven synthetic fibers may include polyethylene terephthalate (PET), polytrimethylene terephthalate (PTT), nylon, polyester, polypropylene, and the like. The hydrophilic surface enhancements may include the application of a strong alkaline treatment under high processing temperatures, polyvinyl alcohol in an alkaline medium, and the like. Other materials and treatments may be used herein. The media sheets 125 may be wetable so as to accept, absorb, flow, and distribute the flow of water 32 or other type of heat exchange medium through the surface area thereof. The media sheets 125 may be utilized with different types of heat exchange mediums.

Generally described, the media sheets 125 may have a substantially three dimensional contoured shape 150. Specifically, the media sheets 125 may include a leading edge 160 facing the incoming inlet air flow 22 and a downstream trailing edge 170 facing about the compressor 12. Likewise, the media sheets 125 may have a top edge 180 for receiving the flow of water 32 and a downstream bottom edge 190 positioned about a drain and the like.

In this example, the first media sheet 130 may have a chevron like corrugated surface 200. The chevron like corrugated surface 200 may have a number of chevron channels 210 therein. Any number of the chevron channels 210 may be used herein in any suitable size, shape, or configuration. Specifically, the chevron channels 210 may have a diagonally rising portion 220 and a diagonally lowering portion 230. The diagonally rising portion 220 may extend from the leading edge 160 and meet the diagonally lowering portion 230 about an apex 240 thereof. The angle of the rising and the lowering portions may vary. Optionally, each of the chevron channels 210 may end in a first side mist eliminator portion 250. The first side mist eliminator portions 250 may extend diagonally upward in a sharp angle at a nadir 260 of each of the diagonally lowering portions 230. The first side mist eliminator portions 250 may extend from the nadir 260 towards the trailing edge 170. Other components and other configurations may be used herein.

The second media sheet 140 may have a wavy corrugated surface 270. Specifically, the wavy corrugated surface 270 may have a number of wavy channels 280. Any number of the wavy channels 280 may be used herein in any size, shape, or configuration. Specifically, the wavy channels 280 may have a substantially sinusoidal like shape 290 with a number of peaks 300 and valleys 310. Optionally, the wavy channels 280 may extend from the leading edge 160 to a second side mist eliminator portion 320. The second side mist eliminator portions 320 may extend diagonally upward in a sharp angle from one of the valleys 310 of the sinusoidal like shape 290. The second side mist eliminator portions 320 may extend from the valley 310 towards the trailing edge 170. Other components and other configurations may be used herein.

FIG. 5 shows a first media sheet 130 bound to a second media sheet 140. The leading edge 160 thus forms a diamond like shape 330. The diamond like shape 330 may include a bonding portion 340 where the media sheets 130, 140 may meet and may be bonded via glue and the like and an expanded portion 350 for good airflow therethrough. The trailing edge 170 likewise may include the diamond like shape 330 for good air flow therethrough. Optionally, the first side mist eliminator portion 250 and the second side mist eliminator portion 320 may combine to form an integrated mist eliminator 360 of a substantially uniform shape about the trailing edge 170. Other components and other configurations may be used herein.

In use, the flow of water 32 may flow from the top edge 180 to the bottom edge 190 of the media sheets 125 in the synthetic media pad 120. The media sheets 125 may be fully wetted by the flow of water 32 therethrough. The inlet air flow 22 enters via the leading edge 160 and comes in contact with the flow of water 32 for heat exchange therewith. Due to the twisting and swirling airflow generated between the media sheets 125, the flow of water 32 may evaporate into the inlet air flow 22 so as to reduce the temperature of the flow of water 32 to about the inlet air wet bulb temperature. Specifically, the twisting and swirling airflows increase heat and mass transfer therethrough.

The use of the chevron like corrugated surface 200 on the first media sheet 130 helps to distribute the flow of water 32 towards the leading edge 160. The wavy corrugated surface 270 of the second media sheet 140 provides stiffness and spreads the flow of water 32 more evenly over the media depth. The optional integrated mist eliminator 360 extends upward at a sharp angle to the airflow therethrough. This angle relies on inertial forces on any water droplets therein at the sharp turn. The water droplets thus may drain downward under the force of gravity and remain within the media sheets 125. The use of the diamond like shape 330 at the leading edge 160 and the trailing edge 170 also serves to reduce air pressure losses therethrough. The wetted media pad 105 described herein thus may increase overall air mass flow in hot weather so as to avoid or limit overall gas turbine output reduction and performance deterioration in a simplified system.

Figure 6:
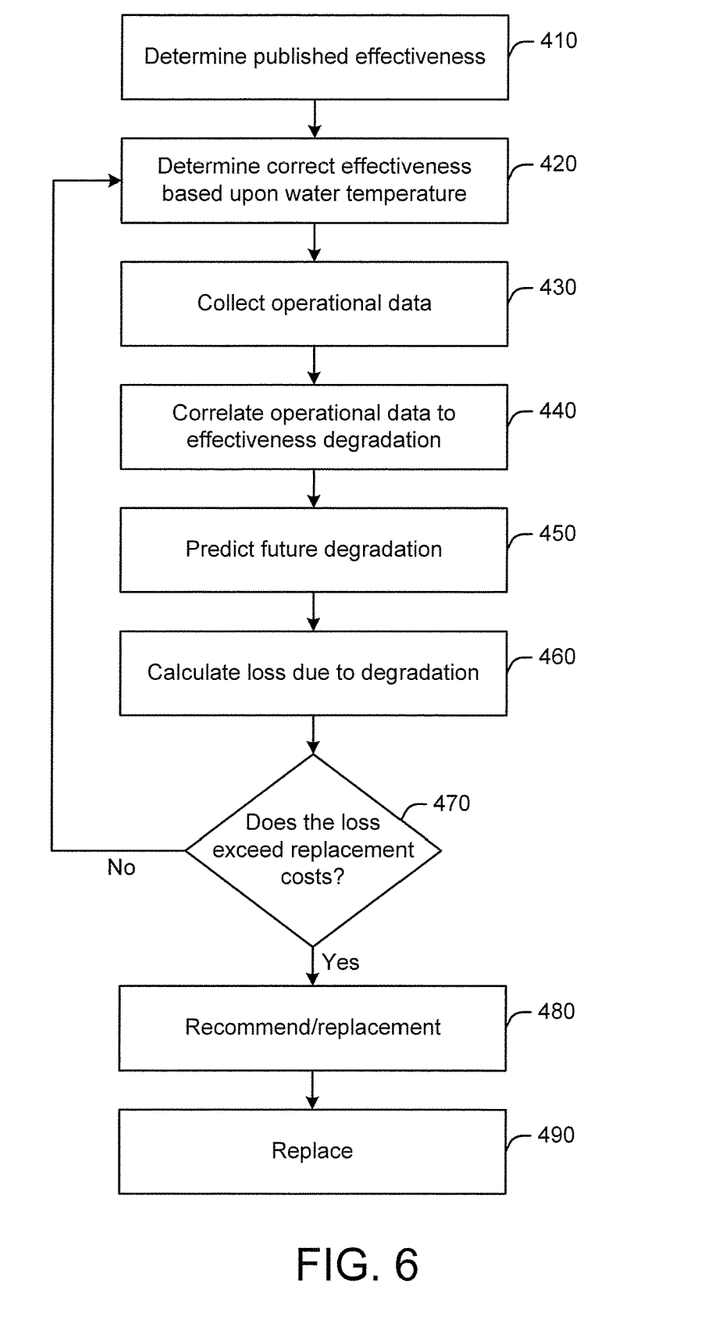
FIG. 6 is a flow chart showing exemplary steps in evaluating evaporative media effectiveness.

FIG. 6 is a flow chart showing exemplary steps in the operation of an evaporative cooling media optimization system 400 for the synthetic media pad 120. The evaporative cooling media optimization system 400 determines an optimized time to replace the synthetic media pad 120 based upon a number of system parameters as determined by the sensors 50.

At step 410, the evaporative cooling media optimization system 400 determines the evaporative medium effectiveness η of the synthetic media pad 120 as provided by the manufacturer, distributor, or other published source. At step 420, the evaporative cooling media optimization system 400 determines the correct evaporative medium effectiveness η based upon water temperature as determined by the temperature sensors 54. Specifically, dry bulb temperature entrance $T_{DBE}$ minus dry bulb temperature exit $T_{DBL}$ divided by dry bulb temperature entrance minus wet bulb temperature entrance $T_{WBE}$ and multiplied by 100%. At step 430, the evaporative cooling media optimization system 400 may collect other types of operational data from the sensors 50 including pump motor current from the current sensor 56, water conductivity from the conductivity sensor 58, air filter efficiency, and other parameters.

At step 440, the evaporative cooling media optimization system 400 may correlate the operational data to the evaporative medium effectiveness η. Specifically, η equals:

$$\eta_0 + k_1(T_{water} - T_{WBE}) + k_2(T_{water} - T_{WBE})^2 +$$
$$AccumulatedOperationTime * \left(\frac{PumpMotorCurrent}{NominalCurrent}\right)^{0.65} = \left[w_1 + w_2 * (1 - FilterEffeciency) + w_3 * \left(\frac{Conductivity}{normalConductivity}\right)\right]$$

At step 450, the evaporative cooling media optimization system 400 may predict future medium degradation over time based up the determined evaporative medium effectiveness η. At step 460, the evaporative cooling media optimization system 400 may calculate the loss of revenue due to the degradation of the media. Specifically:

$$LossInEvapBenefit = k_4 * \int_{t_1}^{t} (\eta(t) - \eta(t_1)) \, dt$$

At step 470, the evaporative cooling media optimization system 400 determines if the Loss in Evaporative Benefit exceeds the cost of changing the medium. If so, the evaporative cooling media optimization system 400 recommends changing the media at time t at step 480. If not, the evaporative cooling media optimization system 400 continues to monitor the media. If replacement is recommended, the media may be replaced at step 490. A sampling rate of about every five (5) minute of operation should be sufficient. Other steps may be used herein in any order.

The evaporative cooling media optimization system 400 optimizes the use and lifetime of the synthetic media pad 120 based upon operational parameters and replacement costs. Such optimization likewise overall gas turbine efficiency and production. Specifically, overall evaporative cooler saturation efficiency is monitored given that media damage/degradation reduces such efficiency.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. As described above, these computer program instructions may be loaded onto a general purpose computer, a special purpose computer, a special purpose hardware-based computer, or other type of programmable data processing apparatus to produce a machine, such that the instructions that execute on the computer or other programmable data processing apparatus create means for implementing the functionality of at least some of the blocks of the block diagrams, or combinations of blocks in the block diagrams discussed below.

These computer program instructions also may be stored in a non-transitory, computer-readable memory that can direct the computer or other programmable data processing apparatus to function in a particular manner, such that the instructions stored in the computer-readable memory produce an article of manufacture including instruction means that implement the functions specified in the block or blocks. The computer program instructions also may be loaded onto a computer or other programmable data processing apparatus to create a series of operational steps to be performed on the computer or other programmable apparatus to produce a computer implemented process such that the instructions that are executed on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand held devices, multiprocessor systems, microprocessor-based or programmable consumer electronics, mini-computers, mainframe computers, and the like. Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A method of evaluating media effectiveness in a gas turbine engine, comprising:
   receiving a baseline media effectiveness rating;
   receiving a media replacement cost;
   receiving a plurality of operating parameters from a plurality of sensors;
   based at least in part on the plurality of operating parameters and the baseline media effectiveness rating, determining a media effectiveness model;
   based at least in part of the media effectiveness model, determining a loss in evaporative benefit cost over time;
   determining a time t when the loss in evaporative benefit cost exceeds the media replacement cost; and
   scheduling media replacement at time t.

2. The method of claim 1, wherein the step of receiving a plurality of operating parameters comprises receiving dry bulb temperatures and wet bulb temperatures.

3. The method of claim 1, wherein the step of receiving a plurality of operating parameters comprises receiving pump motor current.

4. The method of claim 1, wherein the step of receiving a plurality of operating parameters comprises receiving water conductivity.

5. The method of claim 1, wherein the step of receiving a plurality of operating parameters comprises receiving filter efficiency.

6. The method of claim 1, wherein the step of receiving a plurality of operating parameters comprises humidity.

7. The method of claim 1, wherein the step of determining a media effectiveness model comprising accumulated operating time.

8. The method of claim 1, further comprising the step of replacing the media as time t.

9. The method of claim 8, wherein the step of replacing the media at time t comprises replacing a synthetic media.

10. The method of claim 1, wherein the step of receiving a plurality of operating parameters comprising receiving some or all of the plurality of operating parameters about every five minutes of operating time.

11. The system of claim 1, wherein the operating parameters comprise filter efficiency.

12. A gas turbine system, comprising:
   an inlet air system;
   the inlet air system comprising a synthetic media pad;
   a plurality of sensors capable of receiving operating parameters; and
   a controller in communication with the plurality of sensors;
   wherein the controller is operable to perform the following operations:
      determine a media effectiveness model based in part on the operating parameters;
      determine a loss in evaporative benefit cost over time based in part on the media effectiveness model;
      determine a time t when the loss in evaporative benefit cost exceeds the media replacement cost; and
      scheduling media replacement at time t.

13. The system of claim 12, wherein the operating parameters comprise dry bulb temperatures, wet bulb temperatures, and humidity.

14. The system of claim 12, wherein the operating parameters comprise pump motor current.

15. The system of claim 12, wherein the operating parameters comprise water conductivity.

* * * * *